United States Patent [19]

Van Ausdal

[11] 4,308,892

[45] Jan. 5, 1982

[54] ROTARY VALVE

[75] Inventor: Robert K. Van Ausdal, La Crescenta, Calif.

[73] Assignee: The Bendix Corporation, North Hollywood, Calif.

[21] Appl. No.: 83,045

[22] Filed: Oct. 9, 1979

[51] Int. Cl.³ .......................................... F16K 11/07
[52] U.S. Cl. ........................ 137/625.23; 137/624.18; 137/625.24
[58] Field of Search ...................... 137/625.23, 625.21, 137/625.47, 625.11, 624.18, 624.2, 625.22, 625.24; 251/367

[56] References Cited

U.S. PATENT DOCUMENTS 3,022,738 2/1962 Krute .............................. 137/625.23
3,976,103 8/1976 Ostic ................................ 251/367 X Primary Examiner—Alan Cohan
Attorney, Agent, or Firm—Robert C. Smith; William F. Thornton

[57] ABSTRACT

A rotary valve of generally cylindrical configuration is arranged to drive two piston-type hydraulic motors by distributing fluid under pressure and return pressures to and from a series of motor ports which match the inlet ports of the motors. Fluid at inlet pressure and at return pressure is distributed through a series of axial passageways to a number of distribution ports. The distribution ports, which would be extremely complex to fabricate with usual casting or machining techniques, are formed of a number of series of stacked disks whose output or input openings are controlled by a rotary member having radial openings and axial passageways. The disks are formed with a symmetrical pattern of ports such that when flow is initiated from a given opening an oppositely disposed opening also will initiate flow, thus radially balancing the forces. Valving to the two motors is symmetrical around the center of the housing, thus causing the fluid pressure forces to be essentially balanced end to end as well as radially.

10 Claims, 13 Drawing Figures

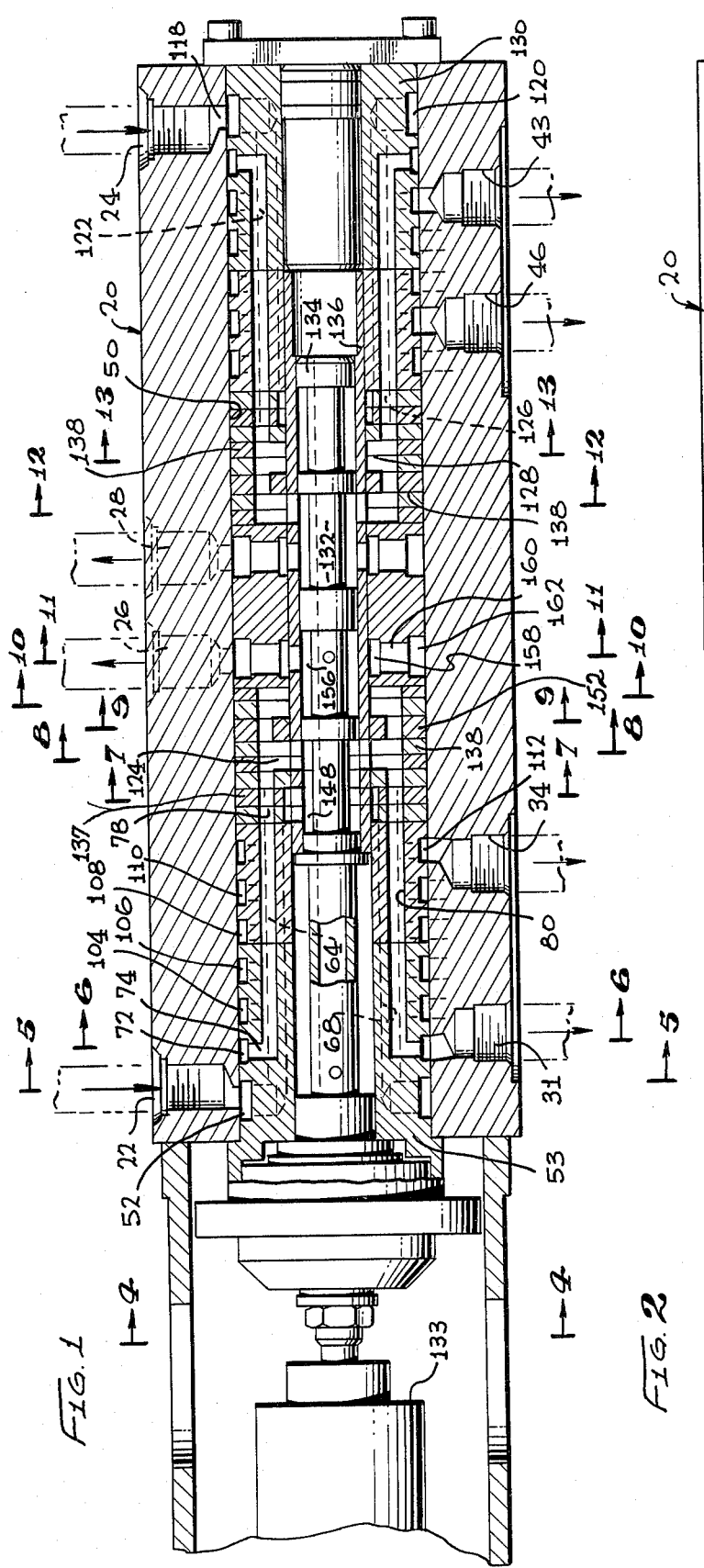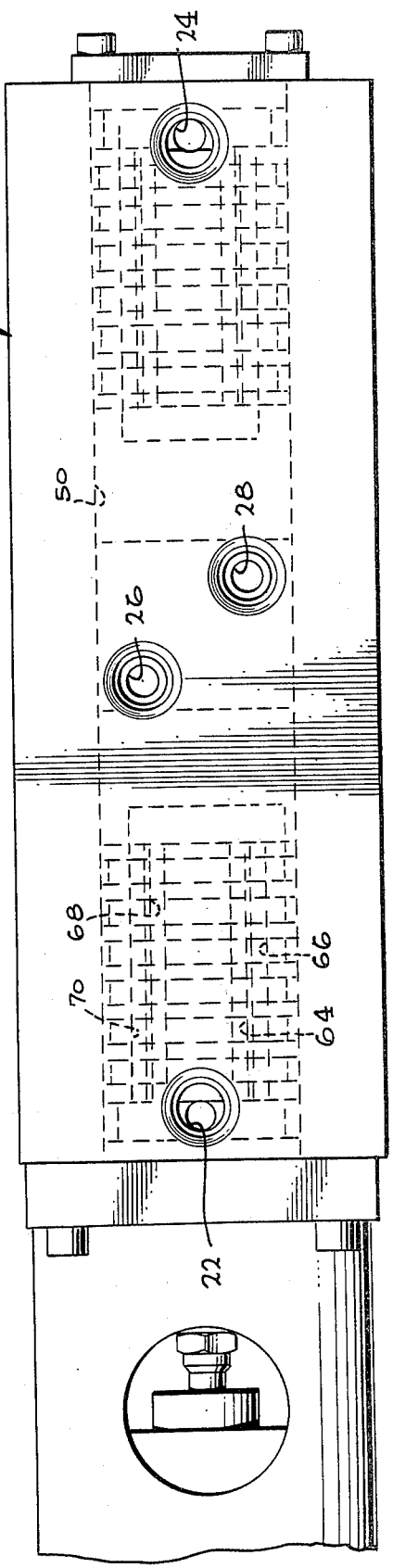

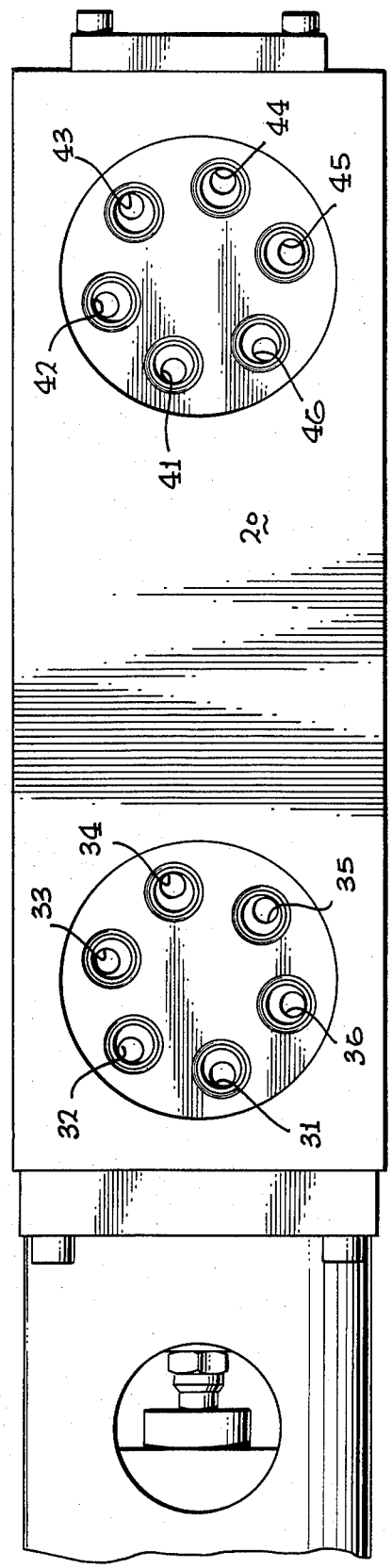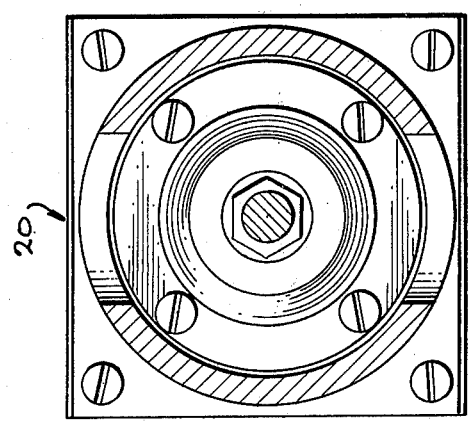

ROTARY VALVE

BACKGROUND OF THE INVENTION

Rotary valves, as such, are not new but have taken many configurations depending on their application. Problems frequently experienced are (1) excessive wear and/or (2) expensive materials required to avoid wear because of end or side loading effects or because of relatively high operating speeds. The valves may become quite expensive and difficult to manufacture where porting is required for many connections to one or more driven motors or other output devices. Such multiple porting arrangement may also result in a rotary valve which is excessively large and heavy. In some analog valving arrangements, the valve may be metering with large pressure drops and very little valve overlap which tends to cause excessive erosion and wear on metering edges. It is desirable, from a wear standpoint, to be able to reduce pressure drops and increase valve overlaps which effect tends to be inherent in a digital-type valve where gating rather than precise metering is required. In some applications the valve may be required to operate at high ambient temperatures which will further exacerbate the wear problem because of reduced lubricity of the operating fluid. Thus it is desirable to provide a rotaty valve mechanism which avoids high operating speeds and high operating pressures and which, although providing flow to multiple output passages, is relatively inexpensive to build and which is not excessively large or heavy.

SUMMARY OF THE INVENTION

Applicant has provided a valve which meets the above operating requirements and which is relatively small, light and compact without being excessively costly to build. Because of the many outlet ports required (in case of applicant's device, six for each of two hydraulic motors), the internal porting becomes somewhat complex, and applicant has designed a manifolding arrangement which, through the use of a plurality of stacked thin metallic disks having patterns of orifices and ports formed therein, as by photoetching, provides the desired passageway arrangement. The passageways in the valve (both disk and others) are arranged to reduce friction and minimize wear by substantially pressure-balancing the fluid pressures radially with essentially symmetrical porting. The porting arrangement is such that a full cycle of inputs to the driven output devices, which are rotary piston-type hydraulic motors, is supplied for each 90 degrees of rotation of the valve. Thus there is a built-in "gear ratio" which permits the valve to operate at one-fourth of the speed of the motors. With different space and weight limitations, porting could readily be devised so that this ratio could be one-half, one-sixth, one-eighth, etc. The larger ratios would require more passageways through the rotary valve such that the driven motors receive a full input at 60 degrees or 45 degrees, for example, of rotation of the valve.

By making it possible to reduce the speed substantially, by providing pressure-balancing, and by permitting digital operation with very low fluid pressure drops, wear is reduced such that the materials used can be relatively soft and therefore inexpensive. Through the use of the stacked disks fastened together by any suitable means, a rather complicated manifolding arrangement is implemented in a compact and relatively light package.

DESCRIPTION OF THE DRAWINGS

FIG. 1 is a cross-sectional view of a rotary valve incorporating my invention;

FIG. 2 is a top view of the valve of FIG. 1;

FIG. 3 is a bottom view of the valve of FIG. 1;

FIG. 4 is a sectional view of the valve of FIG. 1 taken along line 4—4;

DESCRIPTION OF THE PREFERRED EMBODIMENT

Figure 5:
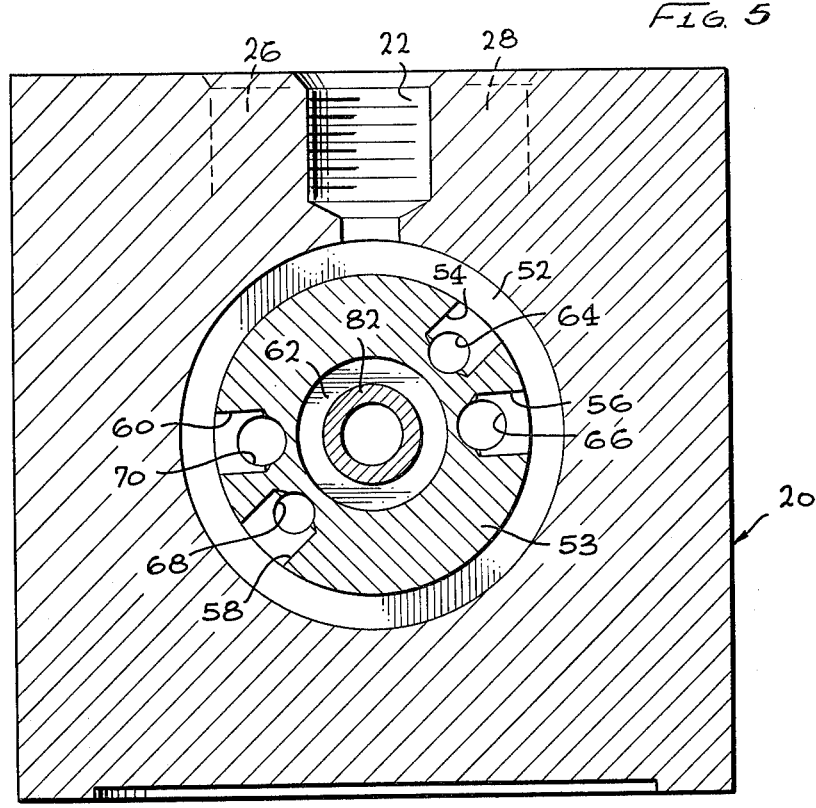
FIG. 5 is a sectional view taken along line 5—5 of FIG. 1.

FIG. 1 is a cross-sectional view of a rotary valve incorporating my invention. It includes a main housing 20 receiving hydraulic fluid from a source, not shown, having a pair of inlet pressure ports 22 and 24. The working fluid is returned to the source from a pair of return pressure ports 26 and 28. The working fluid, which may be conventional hydrocarbon hydraulic oil, is supplied by the rotary valve to a pair of piston-type hydraulic motors (not shown) which may be used to drive any desired load such as an aircraft control surface. The particular hydraulic piston motors to which this rotary valve is mated have six working pistons each, so housing 20 includes two groups of six motor ports 31, 32, 33, 34, 35, 36 and 41, 42, 43, 44, 45, 46 mated to the inlet passages of the respective piston motors. The pattern of the motor ports is shown in FIG. 3, which is a bottom view of the valve of FIG. 1, and it will be recognized that the positions shown in FIG. 1 for motor ports 31 and 34 are slightly modified from their true position for clarity. Similarly motor ports 43 and 46 are not shown exactly as they exist since, in a true section, motor port 46 would not be visible in FIG. 1. Similarly, reference to FIG. 2 shows that inlet ports 22 and 24 are visible as shown in the FIG. 1 sectional view, return port 26 would be as shown in phantom, and return port 28, which would not normally appear, has been shown in phantom to aid in understanding the flow patterns through the valve.

Within housing 20 is an elongated bore 50 containing a number of stationary blocks and stacked disks defining a manifold structure which cooperates with the driven valve members described below to provide flow in the proper sequence to the motor ports 31-36 and 41-46. Inlet passage 22 communicates with an annular chamber 52 in a block 53 which distributes flow to a plurality of radial ports 54, 56, 58 and 60 communicating with axial bores 64, 66, 68 and 70, respectively (see FIG. 5).

Again, some liberties have been taken with the sectioning to clarify the flow patterns since, for example, port 54 and bore 64 would not normally show in FIG. 1 but are actually as shown in FIG. 5. Also seen in this view is an annular chamber 62 surrounding a driven valve member 82.

Figure 6:
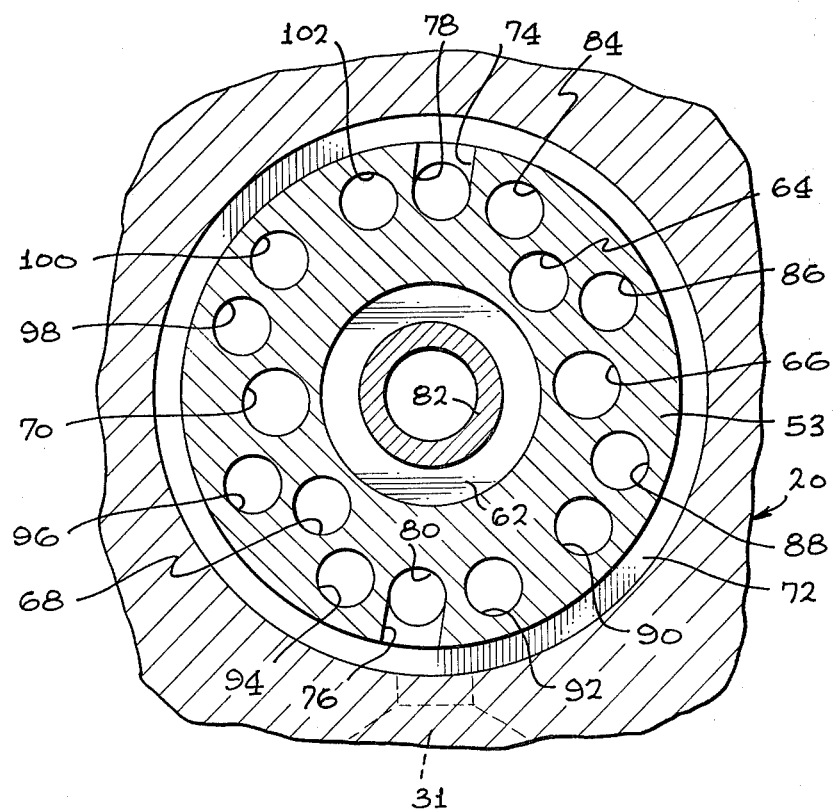
FIG. 6 is a sectional view taken along line 6—6 of FIG. 1.

FIG. 6 is a sectional view along line 6—6 of FIG. 1 which is displaced axially a short distance along block 53 from FIG. 5. This view shows an annular chamber 72 communicating with a pair of radial ports 74 and 76 connected with a pair of axial passageways 78 and 80, respectively. This figure also shows axial bores 64, 66, 68, and 70, previously described, and additional axial bores 84, 86, 88, 90, 92, 94, 96, 98, 100, and 102 which communicate with other axially and radially displaced passageways leading to their respective annular chambers corresponding to chamber 72. Bores 88 and 98 communicate at a point axially displaced from FIG. 6 with an annulus 104 connected to motor port 32; bores 92 and 102 communicate with an annulus 106 connected to motor port 36; bores 84 and 94 communicate with an annulus 108 connected to motor port 33; bores 86 and 96 communicate with an annulus 110 connected to motor port 35; and bores 90 and 100 communicate with an annulus 112 connected to motor port 34.

At the opposite end of valve 20 a directly parallel structure operates to control flow to a second hydraulic motor, not shown, through providing flow in proper sequence to motor ports 41, 42, 43, 44, 45, and 46. Operating fluid at inlet pressure is supplied to inlet port 24, through an opening 118, to an annular chamber 120 communicating with an axial passage 122 in a manner exactly analogous to the connections described from inlet port 22.

Flow from annular chamber 52 is supplied through axial passageways 64, 66 and 68, 70 to a chamber 124 via annular chamber 148 to which are also connected the several axial bores 78, 80, 84, 86, 88, 90, 92, 94, 96, 98, 100, and 102 which communicate with their respective motor ports 31-36 as described above. Similarly axial passageways 122 and 126 connect inlet port 24 with an internal chamber 128 to which is connected a large number of axial bores communicating with motor ports 41-46.

Rotatable within block 53, its corresponding block 130, and a plurality of disks to be described below is a valve member 132 comprised of a multiple land plug member 134 brazed to a sleeve 136. Members 132 and 136 cooperate with a series of disks to direct flow through the valve as required. Valve member 132 receives a rotating input from a stepper motor 133 connected on its left end and is supported on suitable bearings. Operating fluid at return pressure is communicated to both ends of member 132 to effect partial pressure balancing.

Figure 7:
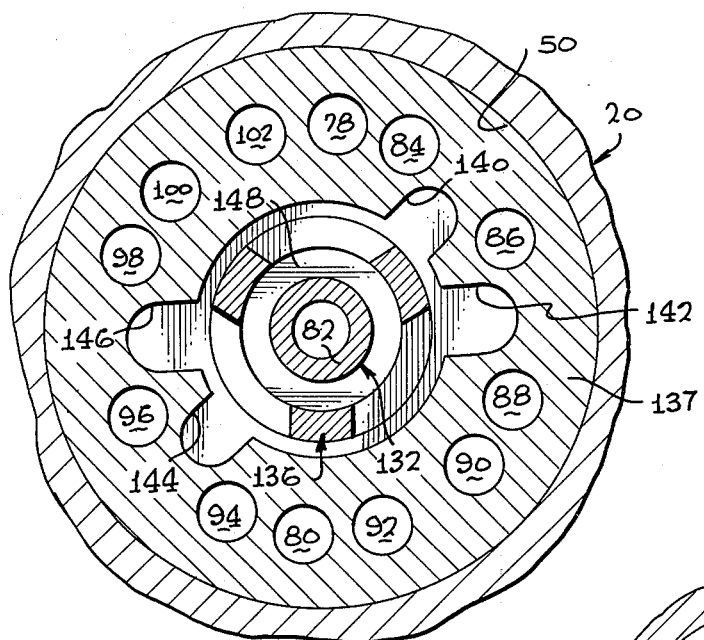
FIG. 7 is a sectional view taken along line 7—7 of FIG. 1.

FIG. 7 is a sectional view taken along line 7—7 of FIG. 1 and shows within bore 50 in housing 20 a disk 137 which is one of a stack surrounding a center rod portion 82 of member 132 concentrically within the sleeve 136 which has openings as shown. Disk 137 includes a pair of slots 140, 142 which register with axial passageways 64 and 66 and a second pair of slots 144, 146 which register with axial passageways 68 and 70, said slots thereby providing communication through openings in sleeve 136 with an elongated annular channel 148 connected to chamber 124. Also present in disk 137 are a plurality of ports which constitute extensions of axial bores 78, 84, 86, 88, 90, 92, 80, 94, 96, 98, 100, and 102.

Figure 8:
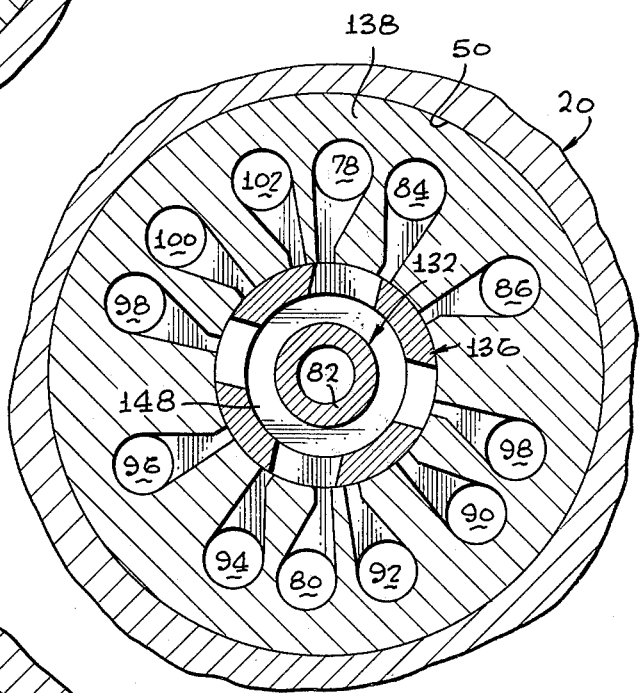
FIG. 8 is a sectional view taken along line 8—8 of FIG. 1.

FIG. 8 is a sectional view taken along line 8—8 of FIG. 1 and shows a disk 138 which is one of a stack and which surrounds sleeve 136 and the center rod portion 82 of member 132. In this view it will be seen that there are four openings in the sleeve 136 rather than three as shown in FIG. 7, which results in repetition of the porting every 90° of rotation of sleeve 136. Disk 138 includes ports constituting extensions of axial bores 78 and 84, 86, 88, 90, 92, 80, 94, 96, 98, 100, and 102, but each such bore adjoins a tapered passageway providing communication between itself and the sleeve 136. It will be observed that there are twelve ports in disk 138 and only six motor ports (FIG. 3). Ports 78 and 80 are connected to motor port 31, ports 88 and 98 to motor port 32, ports 84 and 94 to motor port 33, ports 90 and 100 to motor port 34, ports 86 and 96 to motor port 35, and ports 92 and 102 to motor port 106. As shown, communication is open through slots in sleeve 136 to motor ports 31, 32 and 33 (ports 78, 84, 98 and 80, 94 and 98) and blocked to motor ports 34, 35 and 36. From reference to FIG. 1, it will be appreciated that operating fluid at inlet pressure in channel 148 will flow through the open slots in sleeve 136 into each of the registering axial bores from its corresponding tapered passageway. One-fourth revolution of sleeve 136 provides a complete cycle to both sets of the motor ports 31-36 and 41-46.

Figure 9:
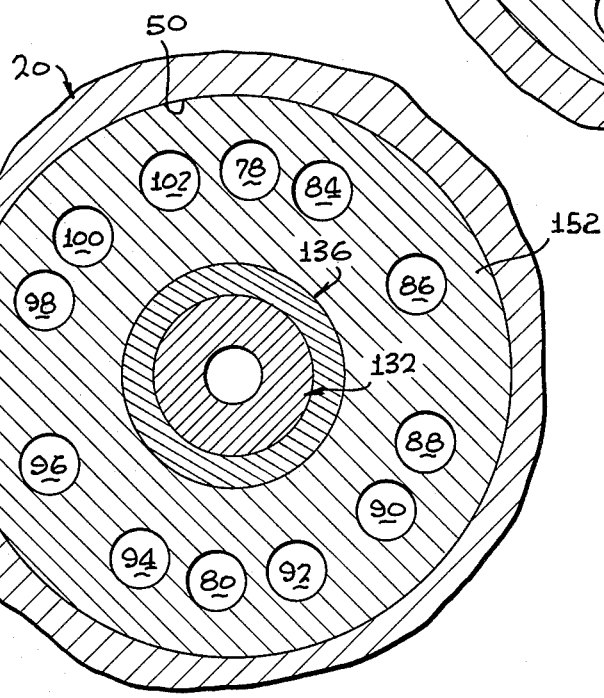
FIG. 9 is a sectional view taken along line 9—9 of FIG. 1.

FIG. 9 is a sectional view taken along line 9—9 of FIG. 1. The disk 152 shown and neighboring disks of the same configuration include ports constituting extensions of the axial bores 78 and 84, 86, 88, 90, 92, 80, 94, 96, 98, 100, and 102. The valve 132 fills all the space within the disk and blocks the axial flow from chamber 148.

Figure 10:
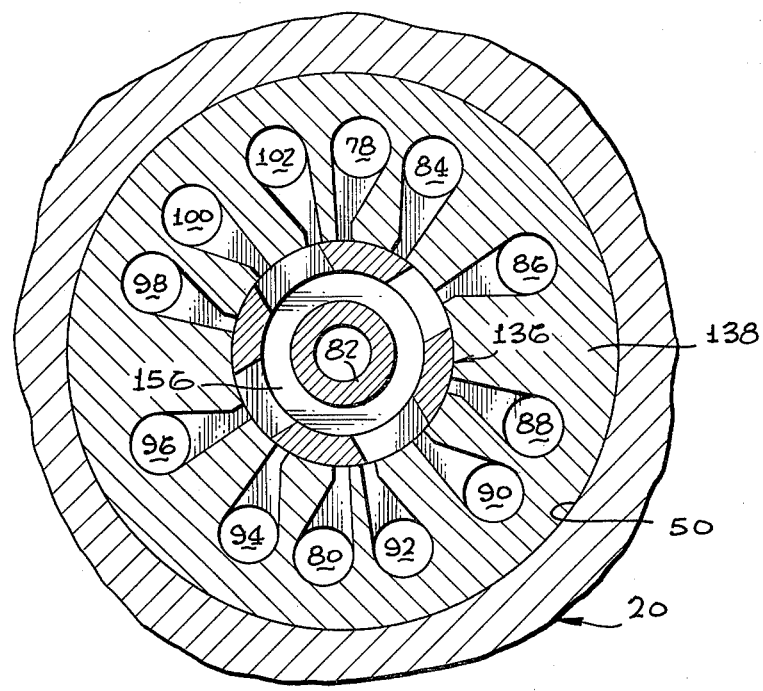
FIG. 10 is a sectional view taken along line 10—10 of FIG. 1.
Figure 11:
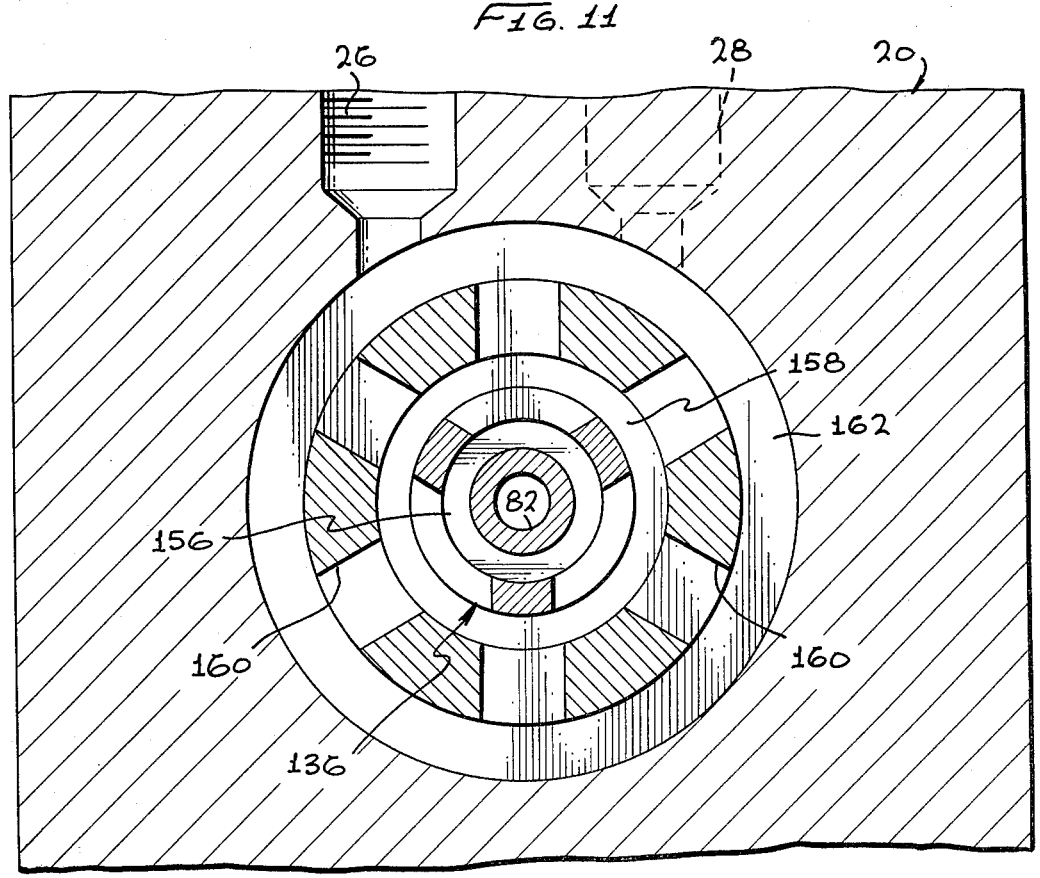
FIG. 11 is a sectional view taken along line 11—11 of FIG. 1.

FIG. 10 is a sectional view taken along line 10—10 of FIG. 1 The disks 138 shown are of the same configuration as those of FIG. 8, but the registrations of the openings of sleeve 136 are different so that the opposite axial bores are opened and blocked. In this view sleeve 136 is in position to block flow to motor ports 31, 32, and 33 and open flow to motor ports 34, 35, and 36. Within sleeve 136 is a return flow annular chamber 156 which communicates with the motor ports as described and which is connected with the return port 26 as shown. This is shown quite clearly in FIG. 11 which is a sectional view taken along line 11—11 of FIG. 1. In this view it is clear that return fluid in chamber 156 may pass across the openings in sleeve 136, across annulus 158, and through a series of radial passageways 160 to annulus 162 adjacent the return port 26.

Figure 12:
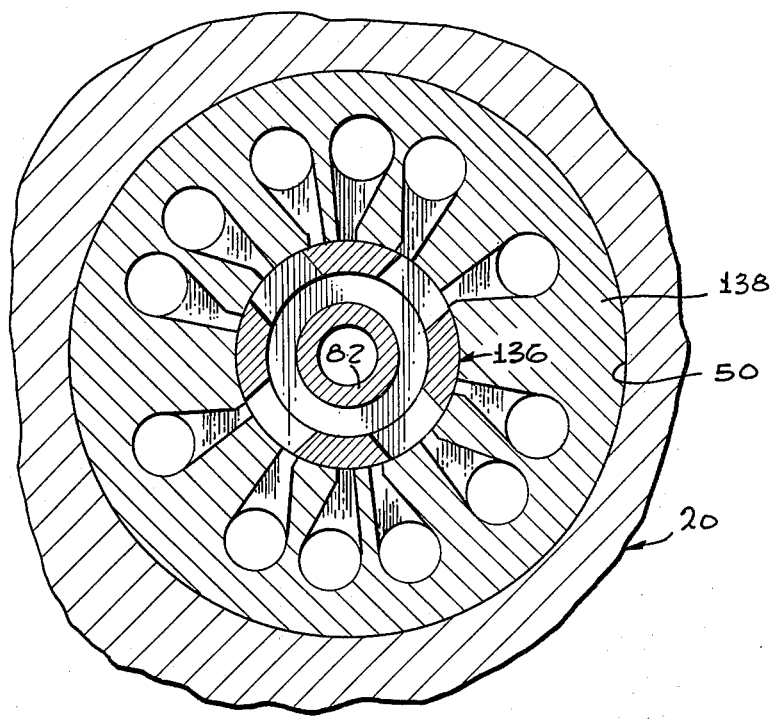
FIG. 12 is a sectional view taken along line 12—12 of FIG. 1.

FIG. 12 is a sectional view taken along line 12—12 of FIG. 1. In this view the disks 138 are again identical to those previously described, and the openings in sleeve 136 are displaced somewhat from those described with respect to FIGS. 8 and 10. This portion of the valve is now controlling flow to and from the second hydraulic motor through motor ports 41-46. In this arrangement, return flow is permitted to flow to return port 28 from motor ports 43, 44, and 45 and no flow through the motor through motor ports 46, 41, and 42.

Figure 13:
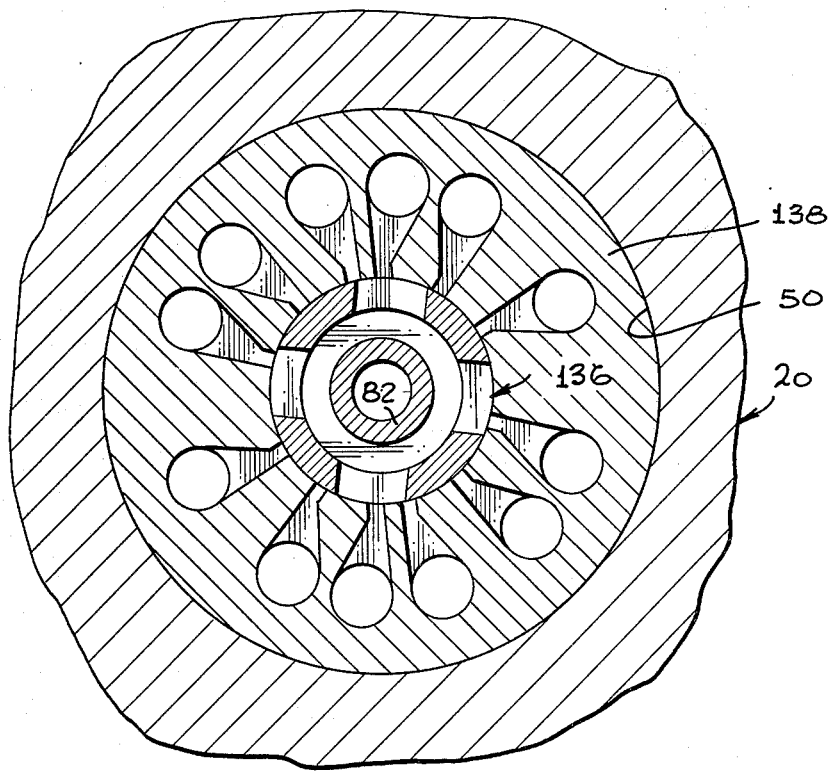
FIG. 13 is a sectional view taken along line 13—13 of FIG. 1.

FIG. 13 is a sectional view taken along line 13—13 of FIG. 1 and also shows a series of disks 138 in a position for the second motor analogous to that of FIG. 8 for the first motor. Again the disks are the same, but the position of the openings in sleeve 136 is different from that of FIG. 8. In this view the inlet pressure fluid is blocked as to ports 43, 44, and 45 and flows to ports 46, 41, and 42.

It will be recognized that although the disks shown in FIGS. 12 and 13 are the same as those shown in FIGS. 8 and 10, the different positions of the openings in sleeve 136 result in flow patterns which are essentially the same but different as to timing. Thus, the two driven hydraulic motors do not receive their power pulses at the same time from corresponding motor ports, but these input pulses are varied to avoid the vibration which would result from a "lock step" type of operation. The flow into and out of the housing 20 is essentially balanced end to end because of the generally symmetrical configuration. Since the disks 138 are also essentially symmetrical, as is the valving within the disks caused by the sleeve 136, the parts are not subject to a series of radial unbalanced forces. With moderate pressures and the speed reduction afforded by the above described configuration, the forces operating in this rotary valve are quite moderate and eliminate the need for expensive, extra-hard parts or parts which are unusually difficult or expensive to fabricate.

While only a single embodiment has been described herein, it is recognized that modifications are within the skill of the art. As stated above, the blocks and disks may be configured for other combinations of ratios by adding more porting, which may increase their diameter and, hence, the diameter of the housing. The valve may be tandem, as shown, single, or multiple tandem as required by any particular application. Other modifications will occur to those skilled in the art.

What is claimed is:

1. A rotary valve for distributing flow to a hydraulic motor including a housing, a fluid inlet port and a fluid return port in said housing for connection to a source of fluid under pressure and a plurality of motor ports for connection to corresponding parts of said motor, fluid distribution means in said housing including an internal cylindrical bore and a driven rotary valve member in said cylindrical bore for directing flow between said inlet and return ports and said motor ports,
characterized in that said fluid distribution means comprises block means in said housing including a passageway constituting at least part of said bore, said block means also including circuit means connecting said inlet and return ports and said motor ports to said bore adjacent said rotary valve member, and a plurality of stacked disks communicating with said conduit means having openings and slots at desired radial positions communicating with said rotary valve member, the positioning of said openings and slots cooperating with said rotary valve member for controlling the delivery of flow from said inlet ports to selected said motor ports and from other selected motor ports to said return port, said block means further including a first block having an annular chamber communicating with said inlet port, a first group of axial bores connected to said annular chamber, a series of annular chambers communicating with individual said motor ports, a second group of axial bores each connected to individual annular chambers of said series, said second group of axial bores being connected to said disks.

2. A rotary valve as claimed in claim 1 wherein said stacked disks include a first set of disks adjacent said first block having openings constituting extensions of said first and second groups of axial bores with slots connecting openings corresponding to said first group with said rotary valve member.

3. A rotary valve as claimed in claim 2 wherein said stacked disks include second and third sets of disks having openings constituting extensions of said second group of axial bores, said second set of disks having slots connecting said openings with said rotary valve member.

4. A rotary valve as claimed in claim 3 wherein said rotary valve member includes at least one axial passageway and radially oriented ports providing selective communication between said passageway and the slots of said disks.

5. A rotary valve as claimed in claim 4 wherein said stacked disks include, in order, said first set adjacent said first block, said second set adjacent said first set, said third set adjacent said second set, and a fourth set adjacent said third set which are of the same configuration as said second set, and said block means includes a second block having an annular chamber communicating with said return port and means connecting said annular chamber with said radially oriented ports of said rotary valve member.

6. A rotary valve as claimed in claim 1 wherein said housing includes an inlet port on each end, a pair of return ports located generally centrally of said housing, two sets of motor ports for connection to each of two hydraulic motors, and one said fluid distribution means is connected to each set of inlet, return and motor ports.

7. A rotary valve as claimed in claim 6 wherein one driven rotary valve member cooperates with each said fluid distribution means to supply both sets of motor ports.

8. A rotary valve as claimed in claim 7 wherein operating fluid at essentially the same pressure is connected to said internal cylindrical bore on both ends of said rotary valve member to effect at least partial pressure balancing.

9. A rotary valve as claimed in claim 3 wherein oppositely directed slots in said disks flow simultaneously so that the reaction forces resulting therefrom are balanced.

10. A rotary valve for distributing flow to inlet ports of each of two hydraulic motors, said valve including a generally cylindrical housing, a pair of fluid inlet ports, a pair of fluid return ports, and a plurality of motor ports connected to each of said hydraulic motors,
characterized in that said housing includes an elongated cylindrical bore, a plurality of blocks in said bore each including an internal cylindrical axial passageway, first and second sets of axial bores, means connecting said fluid inlet ports with said first set of axial bores, a plurality of annular chambers connected to individual said motor ports and radial bores connecting individual axial bores of said second set to individual annular chambers,
a plurality of sets of stacked annular disks in said elongated cylindrical bore, said disks including a first pair of sets adjacent said blocks having openings registering axially with said first set of axial bores and a second set of openings registering axially with said second set of axial bores and means communicating said first set of openings with said elongated cylindrical bore, a second pair of sets of disks adjacent said first sets having openings registering with said second sets of axial bores and radial slots communicating said ports with said elongated cylindrical bore, a third pair of sets of disks adjacent said second sets having ports registering with said second set of axial passages, and a fourth pair of sets of disks adjacent said third sets having ports and slots like said second set;

a centrally disposed block in said elongated cylindrical bore including said return ports and adjacent to each of said fourth set of disks, a driven rotary valve member in said elongated cylindrical bore including axial passages and radially directed openings thereto, said openings cooperating with said radial slots to direct flow to and from individual bores of said second set in a desired sequence.

* * * * *